(12) United States Patent
Okamura

(10) Patent No.: US 6,711,737 B1
(45) Date of Patent: Mar. 23, 2004

(54) DATA PROCESSING SYSTEM, DATA PROCESSING METHOD, AND PROGRAM-PROVIDING MEDIUM THEREWITH

(75) Inventor: Hideaki Okamura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/523,549

(22) Filed: Mar. 10, 2000

(30) Foreign Application Priority Data

Mar. 12, 1999  (JP) .............................. 11-067028

(51) Int. Cl.[7] .............................. G06F 9/44; G06F 9/445
(52) U.S. Cl. .................... 717/173; 717/168; 717/169; 717/171; 717/178
(58) Field of Search ................. 709/200, 201, 709/203, 206, 207, 216, 217, 218, 310, 315, 316, 318; 717/100, 103, 108, 120, 178, 173, 168, 169, 171, 174, 175, 176

(56) References Cited

U.S. PATENT DOCUMENTS

| | | | | | |
|---|---|---|---|---|---|
| 5,274,808 A | * | 12/1993 | Miyao et al. | ................ | 717/168 |
| 5,355,480 A | * | 10/1994 | Smith et al. | ................ | 345/718 |
| 5,432,924 A | * | 7/1995 | D'Souza et al. | ............ | 717/127 |
| 5,581,755 A | * | 12/1996 | Koerber et al. | ............. | 717/170 |
| 5,634,128 A | * | 5/1997 | Messina | ...................... | 709/316 |
| 5,859,977 A | * | 1/1999 | Nishiyama et al. | ......... | 717/173 |
| 5,953,524 A | * | 9/1999 | Meng et al. | ................ | 717/108 |
| 6,003,082 A | * | 12/1999 | Gampper et al. | ........... | 709/225 |
| 6,192,371 B1 | * | 2/2001 | Schultz | ....................... | 711/170 |
| 6,263,364 B1 | * | 7/2001 | Najork et al. | .............. | 709/226 |
| 6,308,182 B1 | * | 10/2001 | Nishigaya et al. | .......... | 707/103 |
| 6,341,373 B1 | * | 1/2002 | Shaw | ......................... | 717/173 |
| 6,401,099 B1 | * | 6/2002 | Koppolu et al. | ........ | 707/103 R |
| 6,453,460 B1 | * | 9/2002 | Keyes | ......................... | 717/108 |
| 6,453,468 B1 | * | 9/2002 | D'Souza | ..................... | 717/168 |

* cited by examiner

Primary Examiner—Todd Ingberg
Assistant Examiner—Qamrun Nahar
(74) Attorney, Agent, or Firm—Frommer Lawrence & Haug LLP; William S. Frommer; Hans R. Mahr

(57) ABSTRACT

A data processing system includes at least one execution subject including at least one object, and at least one execution environment including at least one object for providing the execution subject with services. In the system, based on a request from the object constituting the execution subject or the object constituting the execution environment, the object constituting the execution environment is deleted and a new object is captured from an external system. This performs processing for replacement of the object constituting the execution environment.

26 Claims, 13 Drawing Sheets

DATA PROCESSING SYSTEM, DATA PROCESSING METHOD, AND PROGRAM-PROVIDING MEDIUM THEREWITH

BACKGROUND OF THE INVENTION

1. Field of the Invention

The present invention relates to a data processing system including an execution subject composed of at least one object and an execution environment including an object that provides the execution subject with services, and to a data processing method used in such a data processing system including an execution subject and an execution environment. The present invention also relates to a program-providing medium for providing the data processing system with a data-processing program.

2. Description of the Related Art

In general, an execution subject (such as an application program) runs in an execution environment (such as tan operating system (hereinafter referred to also as an "OS")) in data processing systems. In other words, the execution subject runs using services provided by the execution environment (such as an operating system).

In this type e of data processing system, an operating system that provides an application program with services is normally not designed based on prediction of all application programs to be executed. Accordingly, the operating system cannot always provide services optimized using computational resources in accordance with the features of all the application programs.

This is described below as an example, using two types of application programs "AppA" and "AppB" running on an operating system for providing a message-passing mechanism as a service using computational resources.

Here, it is assumed that the application program AppA consists of program modules constituting a server for a database, and two clients. It is also assumed that the clients access the server with equal priority.

In addition, it is assumed that the application program AppB consists of a client for processing data from an Ethernet network, a client for processing data from a serial line, and a server for performing data processing in accordance with a request from each client.

In general, priority is established in the operation of a serial line and an Ethernet network. Even if messages are frequently exchanged on the serial line, when the Ethernet network transmits a control packet (e.g., a control packet requesting temporary termination of reading of data from the serial line in order that data may be successively read from the Ethernet network), it is requested that the control packet with the highest priority be processed. Unless the control packet having the highest priority is processed, a waiting time is required for processing the control packet that must be processed having the highest priority.

Among the above-described two application programs, the application program AppA does not require the checking of message priority since it has no messages having different degrees of priority. Accordingly, by preferably using a simple message passing mechanism that does not check message priority, the execution performance is improved.

Conversely, the application program AppB requires a mechanism for processing a control packet with the highest priority. Therefore, it is required that a message passing mechanism provided in the application program AppB include a mechanism for checking message priority.

Nevertheless, when the application program AppA is executed, a setting in which the checking of message priority is performed allows the application program AppA to perform the checking of message priority, which is unnecessary for the application program AppA, whereby the execution performance of application program AppA deteriorates. The use of the message passing mechanism that does not check message priority hinders the application program AppB from running in accordance with its requirements when the application program AppB is executed.

As described above, the optimal service, provided for an application program that is operated such that at least two program modules mutually communicate, differs depending on the characteristics of communication between the program modules. Accordingly, it is expected that, in the above-described example, an operating system for providing a message-passing service will be changed in accordance with the characteristics of communication between program modules.

The above-described problems are likely to occur when an application program is updated or a new application program is downloaded and used.

Recently, personal computers and network computers tend to have the function of downloading application programs as a standard specification. In these circumstances, it is highly possible that application programs that have characteristics beyond those considered at the time of system design will be downloaded and executed. Operating systems for use in this environment cannot be designed while predicting the characteristics of all application programs to be executed.

This also applies to embedded operating systems for use in consumer electronics. Most conventional consumer electronics have no support for removal media such as a CD-ROM or a MiniDisk and no network connecting function. They lack environments for updating application programs and for downloading new application programs. Accordingly, the functions of their operating systems must be optimized beforehand in accordance with application programs to be embedded.

However, recently, by providing consumer electronics with support for removal media or a network connecting function, environments for updating application programs and for downloading new application programs are in the process of being established. Accordingly, application programs beyond those predicted at the time of the system design can recently be executed by the consumer electronics. Thus, it is becoming difficult for embedded operating systems to provide all application programs with services that efficiently use computational resources.

As described above, a conventional data processing system cannot always provide services optimized in accordance with the characteristics of each application program. In particular, the data processing system cannot provide services adapted to application programs updated or downloaded after the design of the system. Accordingly, the conventional data processing system has a problem to enable provision of preferable services to application programs which are updated or downloaded after the design of the system.

Meanwhile, it is possible that preferable services be provided to some types of application programs by allowing each of the application programs to select from among a plurality of predictable system-service functions which are prepared beforehand. However, it is impossible to satisfy functions in all types of application programs. Also, embedded operating systems have a limited program size since the amount of hardware memory is in general limited. Accordingly, it is not preferable to prepare a plurality of predictable system-service functions, particularly in the embedded operating systems.

SUMMARY OF THE INVENTION

The present invention is made in view of the above-described conventional circumstances. It is an object of the present invention to provide a data processing system and a data processing method in which an execution environment adapted for an execution subject is provided without preparing a plurality of predictable system-service functions, and to provide a program-providing medium for providing a data-providing program realizing the functions.

To this end, according to an aspect of the present invention, the foregoing object is achieved through provision of a data processing system including: at least one execution subject including at least one object; at least one execution environment including at least one object for providing the execution subject with services; and object-replacing unit which, based on a request from the object constituting the execution subject or the object constituting the execution environment, deletes the object constituting the execution environment and captures a new object from an external system, thereby performing processing for replacement of the object constituting the execution environment.

According to another aspect of the present invention, the foregoing object is achieved through provision of a data processing method for a data processing system including at least one execution subject including at least one object, and at least one execution environment including at least one object for providing the execution subject with services. The data processing method performs, based on a request from one of the object constituting the execution object and the object constituting the execution environment, a deleting step for deleting the object constituting the execution environment and a capturing step for capturing a new object from an external system, whereby the object constituting the execution environment is replaced.

According to a further aspect of the present invention, the foregoing object is achieved through provision of a program-providing medium for providing a data processing program for use in a data processing system including at least one execution subject including at least one object, and at least one execution environment including at least one object for providing the execution subject with services. The data processing program executes processing which, based on a request from the object constituting the execution subject or the object constituting the execution environment, deletes the object constituting the execution environment and captures a new object from an external system, thereby performing processing for replacement of the object constituting the execution environment.

In the present invention, the external system is a server system connected to the data processing system by a transmission link, and includes a storage medium storing the object to be captured.

According to a data processing system of the present invention, by using an object-replacing unit to replace an object constituting an execution environment, the execution environment can be changed in accordance with various types of execution subjects.

According to a data processing method of the present invention, a deleting step deletes an object constituting an execution environment, and a capturing step captures a new object from an external system. As a result, the object constituting the execution environment is replaced. With the replacement of the object constituting the execution environment, the execution environment can be changed in accordance with various types of execution subjects.

DESCRIPTION OF THE PREFERRED EMBODIMENTS

Embodiments of the present invention are described below with reference to the accompanying drawings.

1. Construction of Hardware

Figure 1:
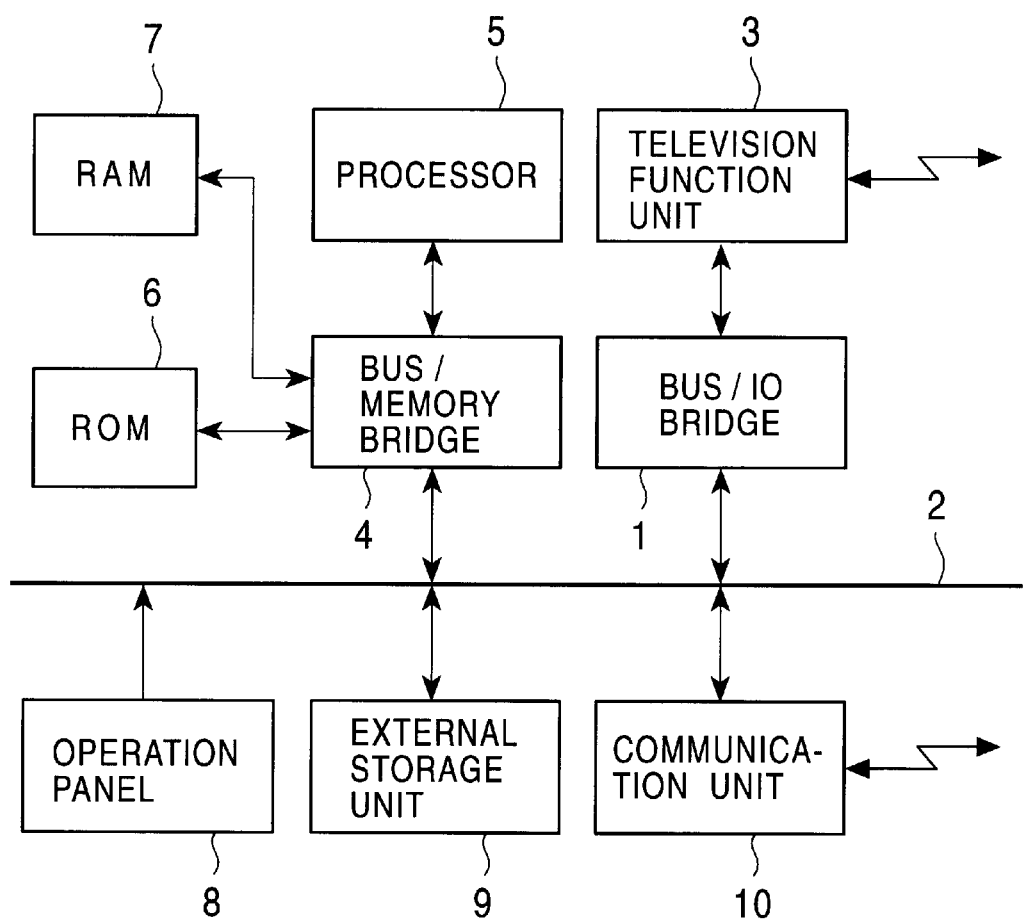
FIG. 1 is a block diagram showing a television receiver to which the present invention is applied.

FIG. 1 shows a construction of hardware to which the present invention is applied. Although a television receiver is used as the hardware, here, the present invention can definitely be applied to other types of data processing system. In other words, the present invention can widely be applied to data processing systems in which an execution subject (such as an application program) runs in an execution environment. For example, it can be applied-to audio-visual apparatuses, various business machines, all-purpose computers, etc., except the television receiver.

The television receiver (shown in FIG. 1), as a data processing system to which the present invention is applied, receives a signal from a broadcasting station via an antenna or a cable, and displays pictures based on the signal on an image display unit such as a cathode-ray tube or a liquid crystal device, while outputting sound from a speaker.

The television receiver not only includes ordinary television functions but also can externally receive programs and data. As shown in FIG. 1, the television receiver includes a television function unit 3 connected to a bus 2 via a bus/IO bridge 1, a processor 5 connected to the bus 2 via a bus/memory bridge 4, a read only memory (ROM) 6 and a random access memory (RAM) 7, which are connected to the processor 5 via the bus/memory bridge 4, and an operating panel 8, an external storage unit 9, and communication unit 10, which are connected to the bus 2.

The television function unit 3 has the function of reproducing a picture and sound based on the signal received by the antenna or cable. The television function unit 3 is connected to the bus 2 via the bus/IO bridge 1. This enables the television function unit 3 to exchange signals with other functional blocks.

The processor 5 controls each of the functional blocks of the television receiver, and is connected to the bus 2 via the bus/memory bridge 4. The ROM 6 and the RAM 7 are connected to the processor 5 via the bus/memory bridge 4. The ROM 6 stores an operating system and application programs for performing control by the processor 5. The RAM 7 is used as a work area. In other words, the processor 5 controls each of the functional blocks constituting the television receiver by executing the operating system and the application programs while using the RAM 7 as a work area.

The operating panel 8 is an input unit for receiving operation inputs from a user. From the operating panel 8, for example, a signal that designates the switching of television channels or the control of the volume on the television is input. The operating panel 8 specifically comprises an input device provided with a plurality of buttons for inputting various signals, and a pointing device such as a so-called "mouse". A signal input from the operating panel 8 is input to the processor 5 via the bus 2 and the bus/memory bridge 4. Based on the signal from the operating panel 8, the processor 5 controls each of the functional blocks by implementing predetermined arithmetic processing.

The external storage unit 9 comprises, for example, a hard disk drive, and is used to store image data, control data, operating systems, and application programs, or various programs externally downloaded via the communication unit 10. The communication unit 10 is an input/output unit for performing data communication to the exterior, and comprises, for example, a modem, a terminal adapter, etc.

The television receiver not only includes ordinary television functions provided by the television function unit 3 but also can receive programs and various types of data from an external system.

In the television receiver, the processor 5 executes an operating system stored in the ROM 6 or the external storage unit 9 and executes an application program stored in the ROM 6 or the external storage unit 9 on the operating system, thereby controlling each of the functional blocks. In other words, on the operating system, for example, an application program for displaying a moving picture on the television function unit 3 and an application program that realizes a graphical user interface (GUI) for controlling the operating panel 8 are executed.

According to the television receiver, in accordance with the application programs running on the operating system, system objects are downloaded from an external system via the communication unit 10, as described in the following Sections 2 to 5, whereby a system environment in accordance with each application program to be executed is provided. This always enables provision of execution environments adapted for various application programs.

2. Outline

In an embodiment of the present invention described below, by downloading an object constituting an operating system in accordance with the characteristics of an application program in order that the construction of the operating system may be flexibly changed, an execution environment adapted for the operation of the application program can be customized.

In other words, by applying object-oriented technology, the function of downloading an object is applied to an operating system. When an object constituting an application program (hereinafter referred to as an "application object") is downloaded, a system object is downloaded, as required, whereby the construction of the operating system is flexibly changed. This makes it possible to customize the operating system so that an execution environment adapted for the operation of the application program is established in accordance with the characteristics of the application program.

An object-oriented operating system that provides as an object a service-providing part of the operating system is introduced as a basic architecture. In addition, the specifications of the system object are made open to an application programmer who fully knows the characteristics of the application program. The application programmer customizes the system object in accordance with the characteristics of the application object constituting the application program. When the application object is downloaded, a customized system object is also downloaded, and the application program is executed.

Figure 2:
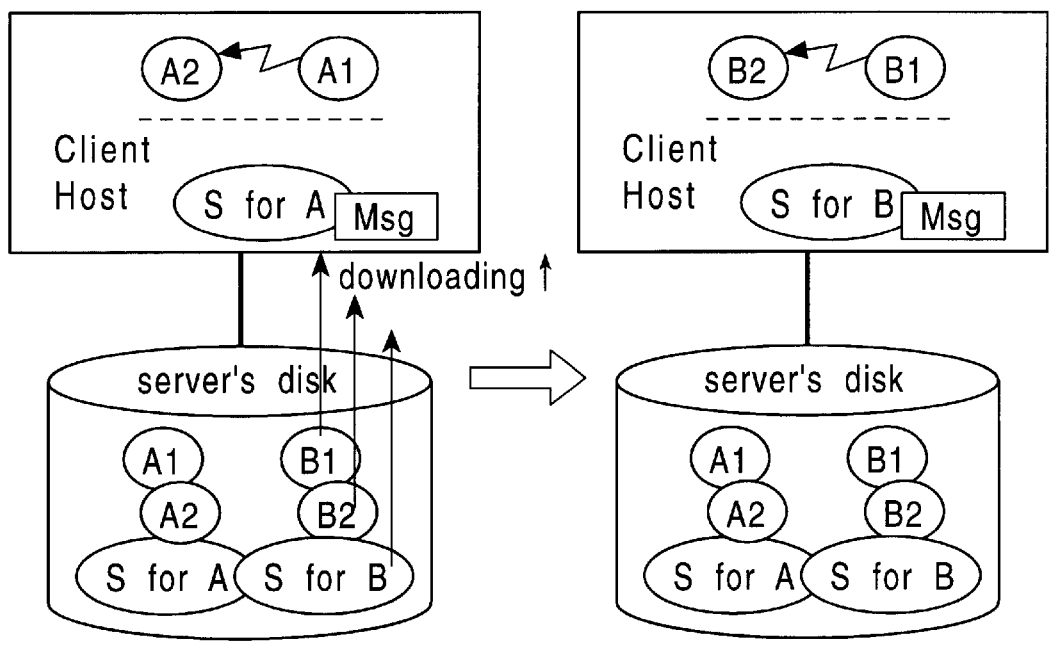
FIG. 2 is an illustration showing an example of the downloading of system objects.

FIG. 2 shows an example of the downloading of a system object. System object "SforA" provides application objects A1 and A2 with massage passing services optimized for application objects A1 and A2. System object "SforB" provides application objects B1 and B2 with massage passing service optimized for application objects B1 and B2. When the application objects A1 and A2 are executed, System object SforA is downloaded at the same time the application objects A1 and A2 are downloaded. When the application objects B1 and B2 are executed, the application objects B1 and B2, and System object SforB, are downloaded after unloading application objects A1 and A2, and System object SforA.

One of the most important requirements on an embedded operating system is to simplify the mechanism of implementing the operating system. This is because it is strongly required that the cost of the system be reduced. The application of the concept of object-oriented technology meets this requirement in the following points. First, by concealing various types of information in an object when a program is downloaded, complicated operations can be simplified. Second, basic execution mechanisms for the system object and the application object are used in common.

However, even if the object-oriented technology having the above-described features is applied, it is necessary to pay attention to the following two problems. The first is a problem caused by the difference between the system object and the application object. The second is a problem caused by implementation on the embedded operating system. In the first problem, what is most paid attention to is that a change must carefully be performed so that the operation of the application object does not stop since the system object must provide a service that should be provided by an operating system, differently from the application object. For coping with the second problem, it is required that the mechanisms of downloading the application object and the system object be used in common and that the amount of storage of use be reduced by deleting unnecessary memory areas when replacing the system object.

3. Specific Method of Downloading System Object

In a method of downloading a system object, there are two features. One feature is to show in what ways requirements for safely downloading the system object differ from requirements for downloading an application object and to show how the requirements are satisfied. Another feature is to show a method of realizing the downloading of the system object, which is effective in an embedded operating system.

(3.1. Assumption of System Architecture)

An assumption of architecture to be inherent in the operating system for the downloading of the system object is described below. An "object" is a program module on which the application programmer can perform changing, addition, deletion, and replacement. Between objects, message passing enables data exchange and activation of a process. The object can become a service-providing module of an operating system or a program module constituting an application program. The former is called "system object" and the latter is called "application object".

An operating system consists of a kernel unchangeable depending on the application programmer and a system object. The kernel has necessary and minimum functions such as context switching between objects. The kernel is also called "micro-kernel" or "nano-kernel". For safety operations of the system, all system objects cannot always be replaced.

The largest difference between the system object and the application object is that the former provides the application object with a service that should be provided by an operating system.

For example, in an object-oriented operating system, a message-transmission request, a memory-assignment request, etc., are defined as services of an operating system. A service request is processed by a special command such as a system call. A service request from an application object is dispatched by a kernel, and a system object is activated. The term "dispatch" means that the kernel performs the steps of recognizing a service request, determining to which system object the kernel should transfer the service request, activating a system object that receives the service request, and transferring the service request to the system object. After the provision of the service ends, control is returned to the application object.

The system object also differs from the application object in that the system object can directly access primitive structures required for execution, that is, computational resources such as an execution stack, a message queue, and a memory segment.

Figure 3:
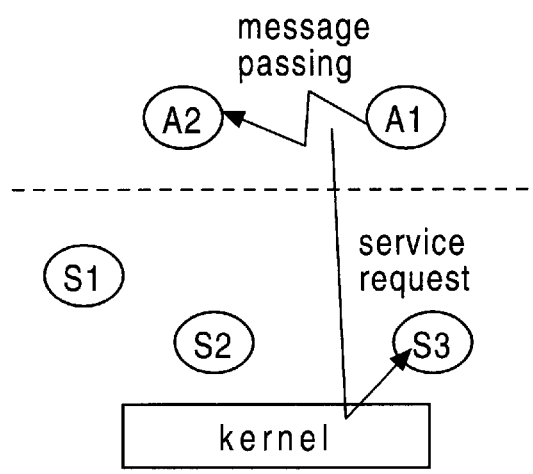
FIG. 3 is an illustration showing an example of a system architecture.

An example of the system architecture assumed in this embodiment is shown in FIG. 3. FIG. 3 shows application objects A1 and A2 that mutually perform message communication, system objects S1 and S2, and a system object S3 that provide a message-passing service. When the application object A1 transmits a message to the application object A2, a message-transmission request is dispatched to the kernel, and the system object S3 that provide a message-passing service is switched to perform control. After the system object S3 finishes providing the service, the application object A2 is activated.

A service of downloading is also provided by a system object. The system object providing a downloading service is called "Downloader". When a download request is generated from an application object or a system object, a kernel activates the system object Downloader, and executes a download process. Details of the download process are described below.

Figure 4:
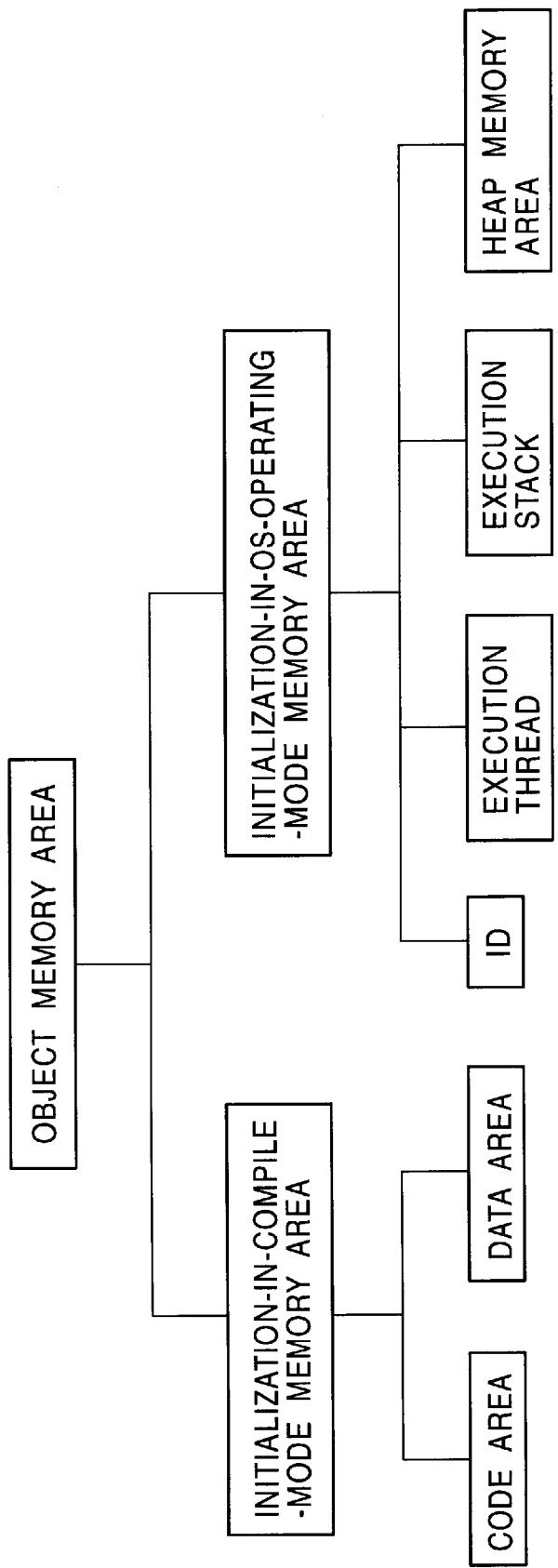
FIG. 4 is an illustration showing memory areas used by objects.

Memory areas used by objects are as shown in FIG. 4, regardless of the difference between the system object and the application object. The memory areas are divided into two types. "Initialization-in-Compile-in-Mode Memory Area" is an area in which a compiler determines an initialization value. The Initialization-in-Compile-in-Mode Memory Area includes "Code Area" for an object-executing method, i.e., a set of executive commands, and "Data Area" in which data for used in the method are stored. When an object is generated, initialization values in binary files generated by the compiler are stored in the areas. The Code Area can be allocated on the ROM 6. "Initialization-in-OS-Operating-Mode Memory Area" is an area in which an operating-system-initialization procedure, executed when booting the operating system, determines initial values. "ID" is an object identifier. "Execution Thread" is a structure representing the state of an object when it is being executed. "Execution Stack" is used at the time of execution. "Heap Memory Area" is a memory area for heap, which is dynamically allocated in the method (e.g., by a new operation in programming language C++). Each of the above-described memory areas is allocated or deleted in the process of generating or deleting an object in accordance with downloading.

(3.2. Requirements on Downloading of System Object)

Requirements for downloading a system object are generally classified into two types. One type is particular requirements caused by the case where a thing to be downloaded is not an application object but a system object. Another type is requirements caused by the case where the characteristics of an embedded operating system are taken into consideration.

Specifically, the system object provides service to the application object. Accordingly, when the system object is downloaded, the following two requirements must be satisfied.

(1) Download Request Certificate

A system-object-downloading request cannot be permitted for all objects. This is because provision of system service might be impossible by replacing the system object with inappropriate timing or performing malicious replacement, and in the worst case, the system might be incapable of operating. To avoid such a situation, it is necessary to use a technique in which, by giving a "download-request certificate" to each object that requests downloading, the number of objects that can request the downloading of a system object can be limited.

(2) Safety Replaceability

There is a possibility that, when the downloading of the system object is initiated, a system object to be replaced is providing a service to an application program. At this time, the operation of the application object may not be guaranteed due to replacement of the system object. For example, when a message-transmission request is generated while a system object that provides a message-transmitting service is being replaced, a malfunction may occur. Also, in the case where, while the system object that provides a message-transmission service is being replaced, an object which is in the process of transmitting a message is detected, an object to be replaced has intermediate data (e.g., a message stored in a message queue) for message-transmission service. Accordingly, the intermediate data must be turned over to a new system object obtained after the replacement. To solve this problem, a mechanism for securing "safety replaceability" is-required.

In addition, in view of the realizing of the system-object downloading mechanism on the embedded operating system, it is preferable that the following two requirements be satisfied for downloading a system object.

(1) For reducing the amount of memory of use in the downloading mechanism, it is preferable to simplify the downloading mechanism. Accordingly, it is preferable that the downloading mechanism be implemented so as to be shared by the system object and the application object.

(2) It is preferable to reduce the amount of memory used while the object is being replaced in the process of downloading. Accordingly, it is preferable to reduce the amount of intermediates required for the replacement of the object.

(3.3. Solutions to Requirements)

A downloading method in which the above-described requirements on the system-object downloading are satisfied is described below.

(3.3.1. Download-Accepting Level and Download-Permitting Level)

To satisfy the requirement "download request certificate" among the requirements shown in Section 3.2, "download-accepting level" and "download-permitting level" are introduced. The former is set in an object to be downloaded, while the latter is set in an object that requests downloading. The download-accepting level is an integer value set for each object, which defines the difficulty of downloading the object. As this value increases, the downloading becomes difficult. The system designer sets an appropriate downloading level for each system object. Basically, a download-accepting level on an application object is set to be smaller than that on a system object. In an object that requests downloading, the download-permitting level is set. The download-permitting level is a value representing the downloading capability of the object. This level is also set as an appropriate value by the system designer.

For example, in the case where the download-accepting level on an object A is $Da\_A$, and the download-permitting level on an object B is $Dp\_B$, only when the following Condition 1 is satisfied is object B permitted to replace object A operating in the system.

$$Da\_A < Dp\_B \quad \text{(Condition 1)}$$

Figure 5:
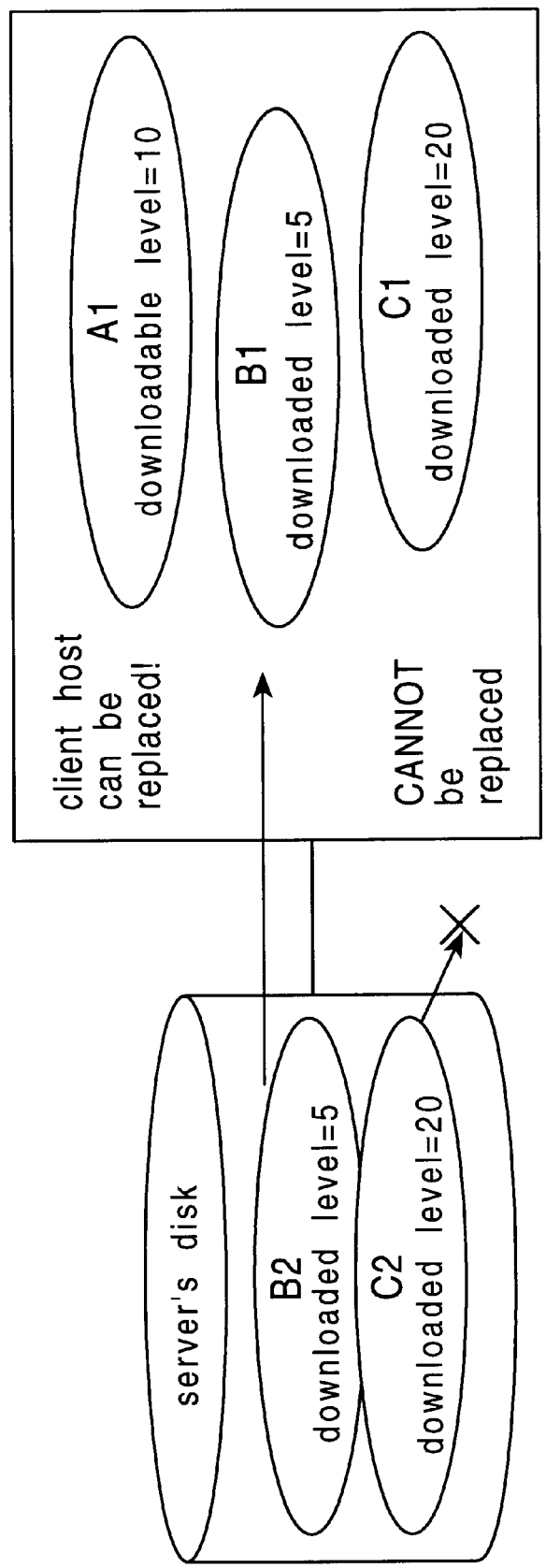
FIG. 5 is an illustration showing download-accepting levels and download-permitting levels.

One example is shown in FIG. 5. Let a download-permitting level (indicated as "downloadable level" in FIG. 5) on the application object A1 be 10, download-accepting levels (indicated as "downloaded levels" in FIG. 5) on the application objects B1 and B2 be 5, download-accepting levels on system objects C1 and C2 be 20. At this time, the application object A1 can replace the application object B1 with the application object B2 by downloading the application object B2. However, the application object A1 cannot replace the system object C1 with the system object C2 by downloading the system object C2.

(3.3.2. System-Dependent List and Service List)

To satisfy the requirement "safety replaceability" among the requirements shown in Section 3.2, a "system-dependent list" and a service list" are introduced. Between an application object and a system object, there is a client/provider relationship. Knowing this relationship is useful for finding with which application object a system object to be downloaded and replaced has a relationship. This relationship is expressed by the system-dependent list and the service list. When a client refers to a provider, a system-dependent list held in the provider is used. When the provider refers to clients, a service list held in the provider is used.

The operation of an application object as a provider is also defined as a set of services provided by a system object. Here, a link that indicates to which application object a system object provides services is a system-dependent list. System-dependent list Dl is defined by the following expression:

$$Dl = \{<Index\_1, Lst\_1>, <Index\_2, Lst\_2>, \ldots, <Index\_n, Lst\_n>\}$$

where Index_n represents a service index; and Lst_n represents a set of system objects providing services. Index_n represents an index of a service provided by an operating system. Lst_n represents a list of system objects providing services. A system-dependent list is defined for each of all objects. The link is used when an application object requests a service, and a kernel activates a system object.

The system-dependent list is basically generated such that the application programmer considers the type of a service to be provided when defining an application object. However, it is difficult for the application programmer to grasp all system services. Accordingly, it is preferable to provide a mechanism that selectively use system-dependent lists predefined by a system manager who defines system services.

When the system object is replaced by performing download, the system-dependent list must be updated while being used. This is because the ID of a system object included in the list may be changed. Updating timing is described in Section 2.3.3.

In addition, the system object as a provider has a service list defined by the following expression:

$$SL = \{<ID\_1, Dl\_1>, <ID\_2, Dl\_2>, \ldots, <ID\_n, Dl\_n>\}$$

where ID_n represents an identifier of an application object; and Dl_n represents a system-dependent list of an application object.

When a system object is downloaded to replace an existing system object, a service list is used to verify that a service by the system object is operating or that the system object is being requested to provide a service. In other words, Object "Downloader" searches the service list of a system object to be replaced for the existence of an application object to which the system object provides services. When the application object is found, processing is performed in which replacement is made to fail or in which replacement is postponed. The system-dependent list in the service list is also used to verify the system-dependent list of each application object.

When an application object is installed on the system, selection of a system-dependent list determines which system object provides services to the application object. Object "Downloader" analyzes the system-dependent list, and the ID and the system-dependent list of the application object to be installed are recorded in the service list of a relevant system object. If the system object provides no service to any of objects, the service list is null.

Figure 6:
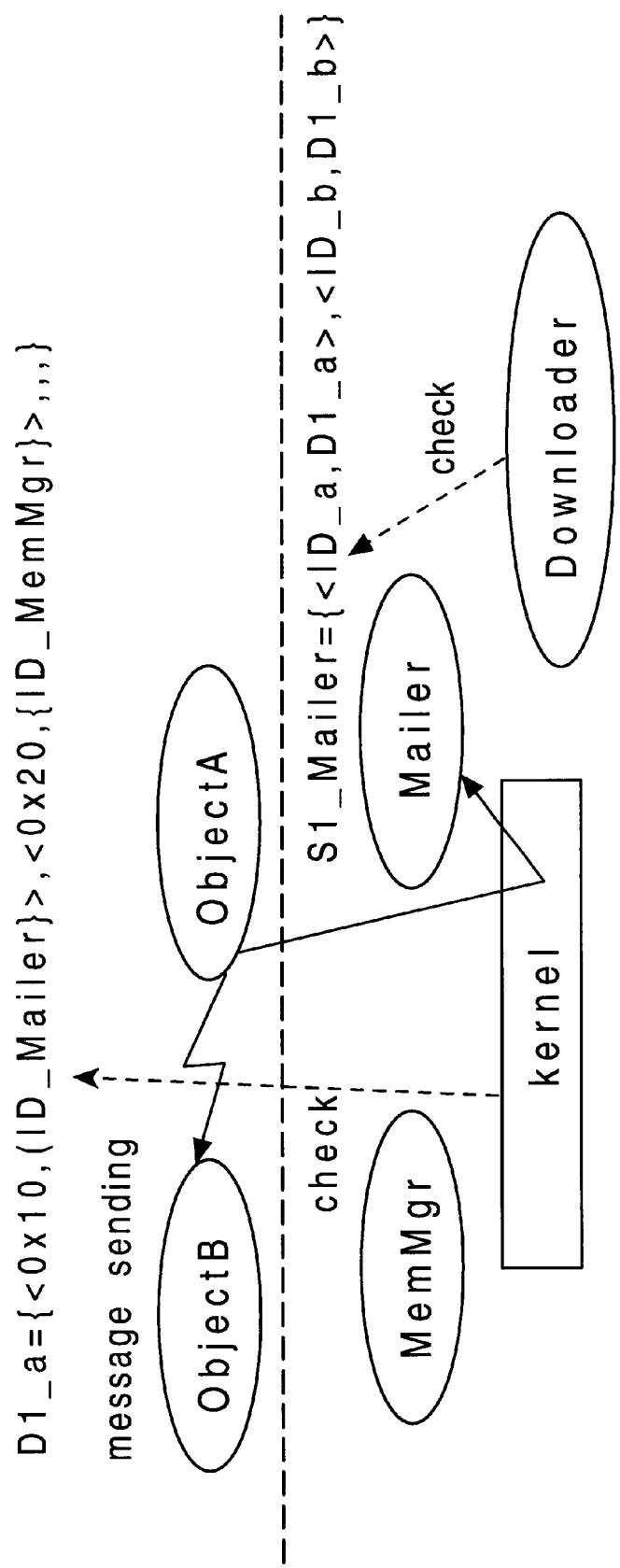
FIG. 6 is an illustration showing an example of a system-dependent list and an example of a service list.

FIG. 6 shows examples of the system-dependent list and the service list. As shown in FIG. 6, the index of a message-transmission service is 0x10, and a system object called "Mailer" provides the service. The index of a memory-allocation service is 0x20, and a system object called "Mem-Mgr" provides the memory-allocation service. The system-dependent list Dl_a of the application object "object A" is expressed as {<0x10,{Mailer}>,<0x20,{MemMgr}>, . . . }. After dispatching a message-transmitting request, the kernel traces system-dependent list Dl_a and activates Object "Mailer".

In this example, when replacing Object "Mailer", Object "Downloader" checks the service list Sl_Mailer=Sl_Mailer={<ID_a, Dl_a>, <ID_b, Dl_b>} (where ID_a represents an identifier for object A; and ID_b represents an identifier for object B). Object "Mailer" verifies the existence of an application object, thereby verifying that a service is being provided. In the case where the application object object A" and the system object "Mailer" are successively replaced, if Object A had been deleted before Object "Mailer" was replaced, "Mailer" can be deleted and replaced without any problem.

(3.4. Replacement Algorithm)

An algorithm for replacing an existing system object by downloading a system object is described below. The algorithm (described below) satisfies the requirements "download request certificate" and "safety replaceability".

The method of downloading a system object, described in Section 3.3, can be simultaneously used with the downloading of an application object. By downloading a system object adapted for the characteristics of the operation of an application in association with the downloading of an application object, the operation of the application object can be customized. The downloading of the application object and the downloading of the system object are given by the same algorithm. Thereby, parts downloaded as much as possible can be shared by the application object and the system object when the functions of an embedded operating system are paid attention to.

However, the internal operation of Object "Downloader" requires a method of discriminating between an application object and a system object. Accordingly, it is possible that each system-dependent list be predetermined whether for an application object or for a system object. This method eliminates the need for defining an unnecessary discriminating flag, and is effective in saving the amount of memory of use.

A process of replacing a system object consists of the following two phases.

(1) Unload Phase

An unload phase deletes an old object. The unload phase consists of two phases, a deletion phase and a free phase. The deletion phase disables the operation of an old system object, and the free phase frees a data area being used by the old system object.

(2) Load Phase

A load phase generates a new object. The load phase consists of two phases, an allocation phase and a generation phase. The allocation phase allocates a data area to a new system object, and initializes the area. The generation phase enables the operation of the system object.

Details of the above-described phases are described below.

(3.4.1. Unload Phase)

The unload phase disables the operation of an existing system object and frees a memory area used by an object to be deleted, thereby preparing for the downloading of a new system object.

At first, the deletion phase, which is the former half of the unload phase, is described below with reference to FIG. 7.

In step S1, the deletion phase determines whether the above-described Condition 1 is satisfied. In other words, the deletion phase determines whether the download-permitting level of an object that requests unloading is greater than the downloading-accepting level of a system object to be deleted. If Condition 1 is not satisfied, the deletion phase responds with an error, and aborts the unload phase.

In step S2, the deletion phase determines whether the object to be deleted is a system object or an application object. If the object to be deleted is an application object, the deletion phase terminates. If the object to be deleted is a system object, the deletion phase proceeds to step S3.

In step S3, the deletion phase checks an object that is operating. Object "Downloader" verifies that the service list of the object to be deleted is null. If the service list is null, the deletion phase terminates. If the service list is not null, the deletion phase proceeds to step S4.

In step S4, the deletion phase verifies that each of application objects correctly holds a system-dependent list in a service list. If a system-dependent list is not correctly held, the deletion phase responds with an error, and aborts the unload phase.

In step S5, the deletion phase checks the operating state of an application object recorded in the service list. The types of the operating state of the application object can include a standby state ("Dormant"), an operating state ("Running"), a response-awaiting ("Waiting"), and an invalid state ("Free"). The "Dormant" is a state in which a message can be received from another object. The "Running" is a state in which processing is being performed. The "Waiting" is a state in which a response to a message transmitted to another object is being awaited. The "Free" is a state in which nothing is being executed. In the "Free", it is impossible to receive a message from another object.

As a result of the checking in Step S5, if there is an application object that is "Running" or "Waiting", the deletion phase proceeds to step S6.

In step S6, the deletion phase requests a scheduler as one of system objects to postpone deletion of the system object. The scheduler is a system object that performs scheduling. In the scheduler, a method that is activated when the operation of an object terminates can be recorded. Accordingly, the scheduler, requested to postpone deletion of the system object, registers a running application object in the object list so that the unload phase is restarted when the operation of the application object terminates.

As a result of the checking in Step S5, if there is no application object that is "Running" or "Awaiting", the deletion phase proceeds to step S7.

In step S7, the operating state of the object requested to be deleted is made "Free". At this point, scheduling on the object is not performed, and a message is not received.

In step S8, the service list of the system object to be deleted is recorded in the "Downloader" in order that the service list of the system object may be transferred to the new object.

In step S9, in order that the internal state of the object to be deleted may be transferred to the new object, the internal state of the object to be deleted is recorded in Object "Downloader". Also, data to be transferred to the new object are recorded in Object "Downloader". Here, information on what are transferred to the new object, and a method to be activated for performing transfer to the new object, are recorded in Object "Downloader" beforehand. Processing in Step S9 is not essential, and is performed only when an internal state, etc., must be transferred depending on the type of system object.

Figure 8:
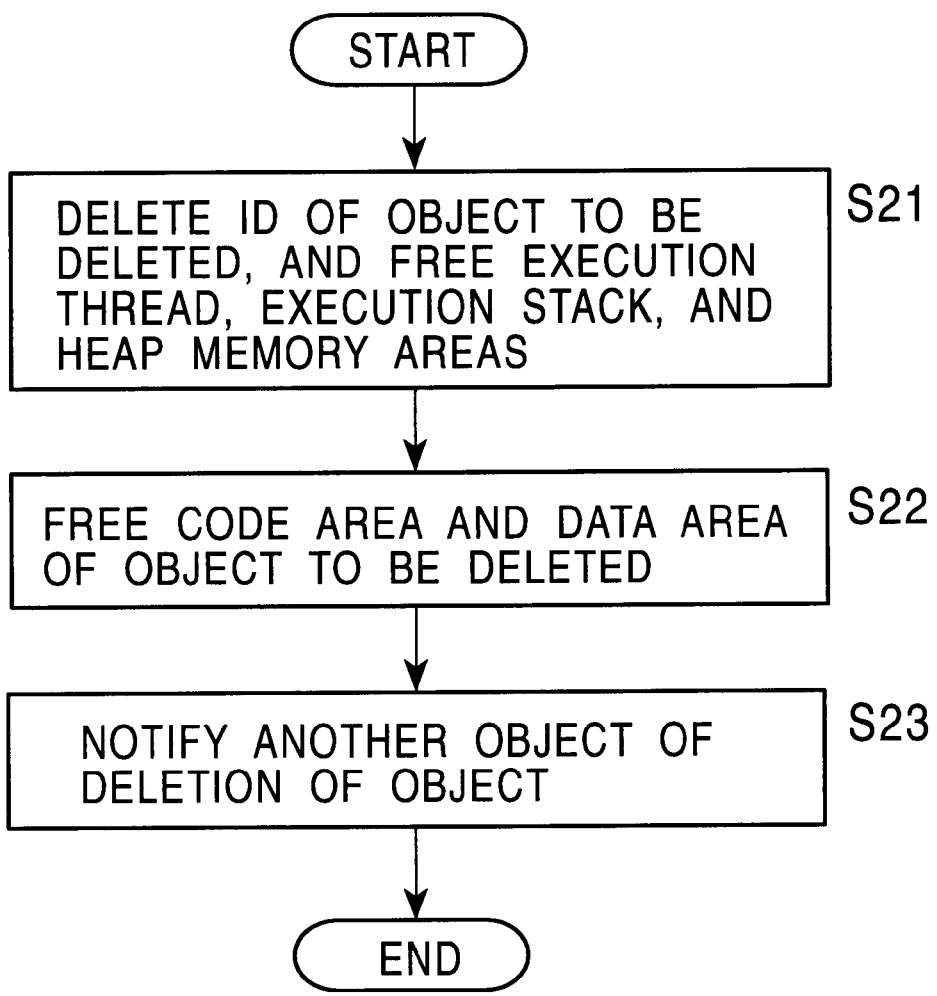
FIG. 8 is a flowchart showing an example of a process performed in a free phase that is the latter half of an unload phase.

With the above-described processing, the deletion phase is completed, and transfer to the free phase is performed. The free phase, which is the latter half of the unload phase, is described below with reference to FIG. 8.

In step S21, the unload phase deletes the ID of the object to be deleted, and frees a memory area for an execution thread, an execution stack, and a heap.

In step S22, the unload phase frees a code area and a data area of the object to be deleted.

In step S23, the unload phase notifies another object recorded beforehand of deletion of the object. The notification is performed in order that a reference to the deleted object may be deleted and internal data may be re-initialized.

With the above-described processing, the deletion phase that disables the operation of an old system object, and the free phase that frees a data area used by the old system object, are completed, whereby the unload phase that deletes the old object is completed.

When the characteristics of the embedded system are taken into consideration, the checking of the operating state of the object (in Step S5 in the deletion phase) is not always required in the unload phase. By way of example, each application object to which a system object to be replaced provides services may be stopped on the responsibility of the application programmer. Otherwise, after performing deletion, the operation of a system object may be disabled. In this technique, both an old system object and a new system object do not simultaneously exist while replacement is being performed. Thus, the amount of memory required for replacement can be saved. In addition, the need for using a code for processing an operating application object is eliminated, saving the amount of memory.

A condition that determines whether a procedure for processing an operating application object is required is a trade-off between a load on programming required for stopping the application object and the amount of required memory.

In addition, by inhibiting transfer (step S9 in the deletion phase) of internal state information of a system object, etc., and deleting a code for processing the internal state information of a system object, etc., the amount of memory can be saved.

Figure 7:
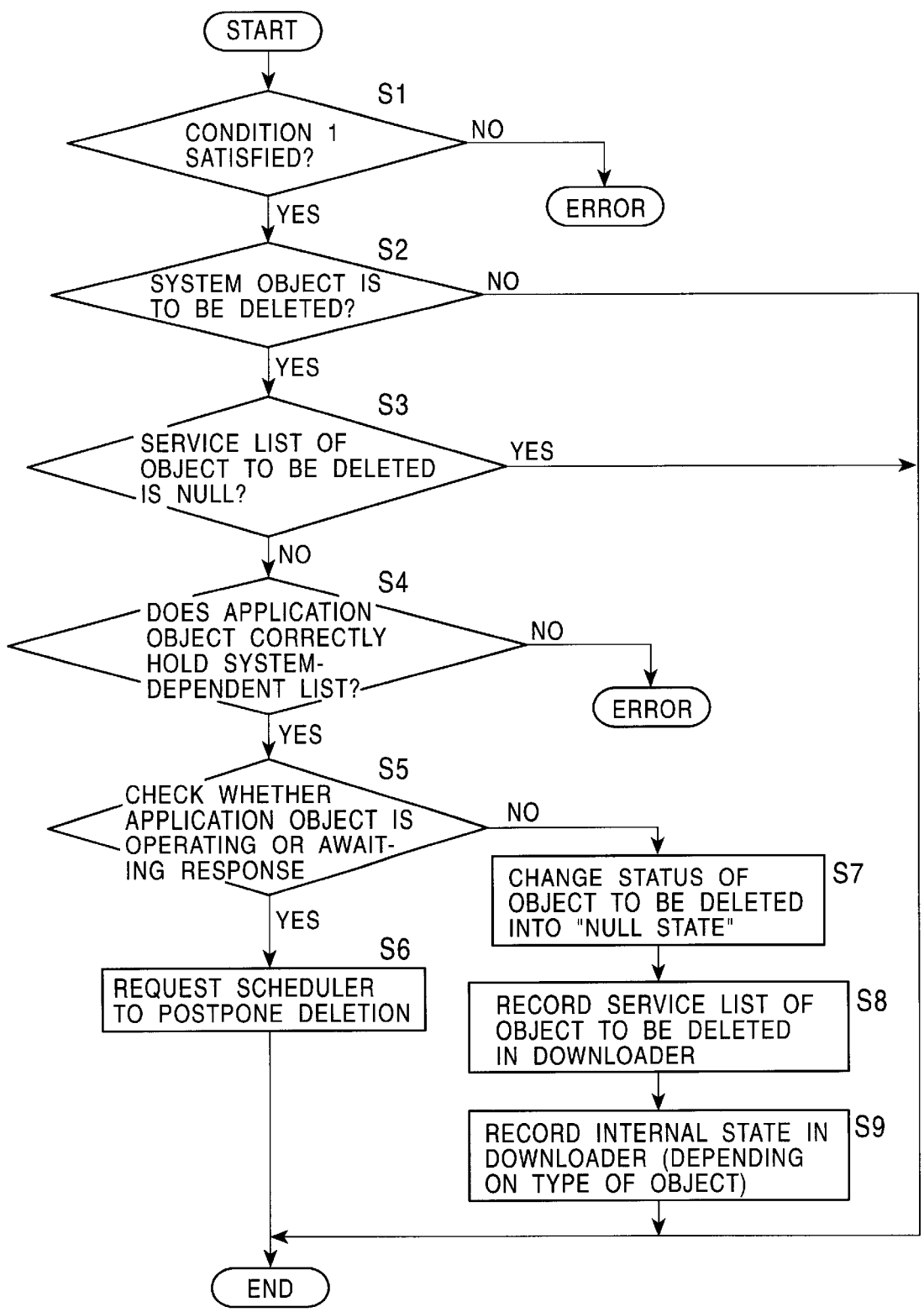
FIG. 7 is a flowchart showing an example of a process performed in a deletion phase that is the former half of an unload phase.

As described above, the algorithm for the deletion phase is not limited to the example shown in FIG. 7. Accordingly, it is preferable that algorithms for the deletion phase be selected depending on the configuration and characteristics of the system.

(3.4.2. Load Phase)

The load phase reserves memory areas required for a new object, and downloads the object.

Figure 9:
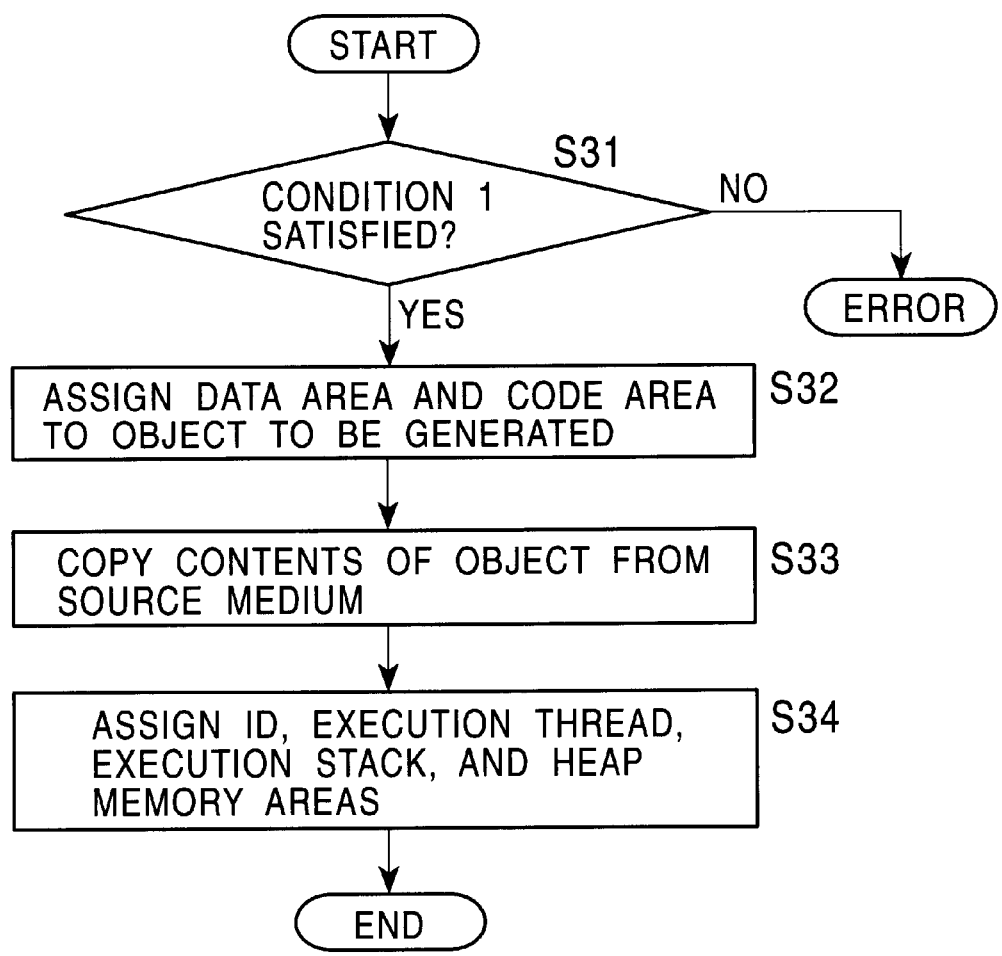
FIG. 9 is a flowchart showing an example of a process performed in an allocation phase that is the former half of a load phase.

The allocation phase, which is the former half of the load phase, is described below with reference to FIG. 9.

In step S31, the allocation phase determines whether the above-described Condition 1 is satisfied. In other words, the allocation phase determines whether a download-permitting level on an object that requests unloading is greater than a download-accepting level on an system object to be unloaded. If Condition 1 is not satisfied, the allocation phase responds with an error, and aborts the load phase.

In this embodiment, an algorithm is employed in which the system does not cancel the unload phase, even if an error is received as a response. Accordingly, before the start of the unload phase, the application programmer must securely verify that an object to be generated satisfies Condition 1 The reason that the system does not perform cancellation of the unload phase is that specifications are employed in which a memory area for an object to be deleted is freed so that a memory area for an object to be generated is reserved before the load phase.

If Condition 1 is satisfied in Step S31, the allocation phase proceeds to step S32, and allocates a data area and a code area for the object to be generated.

In step S33, the contents of the object to be generated are copied from a source medium from which downloading is performed (e.g., a file system on a network, or a recording medium such as a removal medium or a flash ROM).

In step S34, an ID, memory areas for an execution thread, an execution stack, and a heap are allocated to the object to be generated.

Figure 10:
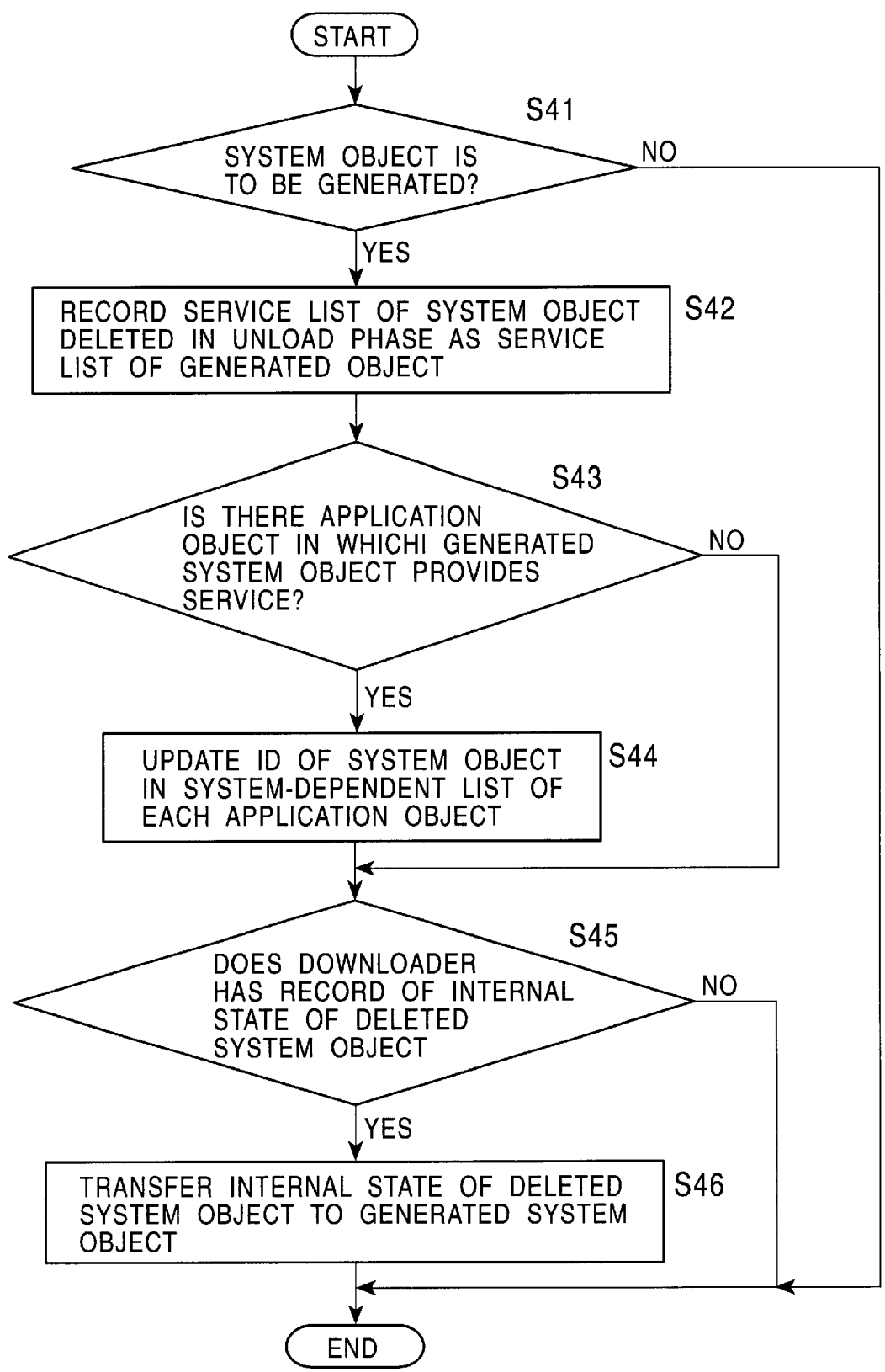
FIG. 10 is a flowchart showing an example of a process performed in a generation phase that is the latter half of a load phase.

With the above-described processing, the allocation phase is completed, and transfer to the generation phase is performed. The generation phase, which is the latter half of the load phase, is described below with reference to FIG. 10.

In step S41, the generation phase determines whether the object to be generated is a system object or an application object. When the object to be generated is a system object, the generation phase proceeds to step S42. When the object to be generated is an application object, the generation phase terminates.

In step S42, the service list of the system object deleted in the unload phase is recorded as the service list of the object to be generated. In other words, the service list of the old system object is transferred to the new system object.

In step S43, based on the service list transferred in Step S42, the generation phase determines whether there is an application object to which the generated system object provides services. If there is the application object, the generation phase proceeds to step S44. If there is not the application object, the generation phase proceeds to step S45.

In step S44, the generation phase updates the ID of a system object in the system-dependent list of each application object to which the system object provides services. In other words, the ID of the old system object in the system-dependent list of each application object is replaced by the ID of the system object to be generated. After that, the generation phase proceeds to step S45.

In step S45, the generation phase determines whether the internal state of the deleted system object is recorded in Object "Downloader". If the internal state of the deleted system object is not recorded, the generation phase terminates. If the internal state of the deleted system object is recorded, the generation phase proceeds to step S46.

In step S46, the internal state of the deleted system object is transferred to the generated system object. In other words, internal data transferred from the old system object are transferred to the new system object.

With the above-described processing, the allocation phase that allocates and initializes a data area to be used by a new system object, and the generation phase that enables the operation of the new system object, are completed, whereby the load phase that generates a new object is completed.

3.5. Downloading Application Interface)

The downloading of an application object and the downloading of a system object are described by the same application interface (application program interface (API)). Specifically, this embodiment provides the following two APIs "Load( )" and "Unload( )" as APIs for downloading a system object and an application object. These APIs can be used inside the application object and inside the system object.

error Load(Symbol objectName)
    error Unload(Symbol objectName)

"Load( )" is an API for downloading an object. In the procedure of replacement, the load phase is executed by calling "Load( )". When "Load( )" is called, an object designated by argument "objectName" is downloaded. The application object and the system object basically exist in spaces having the same name. When the application object is downloaded, processing such as the updating of the system-dependent list (in Steps S42 to S46 in the generation phase) is omitted.

"Unload( )" is an API for unloading the object, in other words, an API for deleting the existing object. In the procedure of replacement, the unload phase is executed by calling "Unload( )". When "Unload( )" is called, an object designated by "objectName" is unloaded. What is to be unloaded may be an application object or a system object. When an application object is unloaded, processing such as verification of the system-dependent list (in Steps S3 to S9) is omitted.

The two APIs can be used in the application object. Thus, an application object and a system object can be downloaded with timing convenient for the application object. Sequential operations for performing replacement are realized by successively using "Unload( )" and "Load( )".

By way of example, let two application objects AppA and AppB to exist. At this time, System object SforA optimized in accordance with the characteristics of application object AppA, and System object SforB optimized in accordance with the characteristics of application object AppB, are prepared. An application object for downloading application objects AppA and AppB is represented by AppC. The following is an example of a program for the application object AppC.

```
AppC::LoadAppA( )
{   Load("SforA")
    Load("AppA")
}
AppC::ReplaceAppA( )
{   Unload("AppA")
    Unload("SforA")
    Load("SforB")
    Load("AppB")
}
```

Before downloading the application object AppA, the application object AppC uses "Load( )" to load System object SforA in the LoadAppA( ) method. This provides an optimized system service to the application object AppA. After that, when the application object AppB is executed, the ReplaceAppA( ) method unloads the application object AppA and System-object SforA, and downloads the application object AppB and System object SforB. This provides an optimized system service to the application object AppB. When the application object AppB is downloaded, the old application object AppA and System object SforA unnecessary for executing the application object AppB are unloaded using "Unload( )". This prevents the memory from consuming unnecessarily when the application object AppB is executed and replaced.

4. Example of Customizing Application Object and Effects Thereof

An example of customizing in the execution of an application object which uses the downloading of a system object, and effects of customizing, are described below.

(4.1. Example 1: Improvement in Message Passing Method)

It is assumed that application object AppA consists of three application objects AO-a1, AO-a2, and AO-a3. It is also assumed that the application objects AO-a1, AO-a2, and AO-a3 perform message passing with equal priority and equal frequency. A simple message-passing mechanism using a first-in first-out (FIFO) queue is required from the point of the execution performance of application object AppA.

It is also assumed that the application object AppB consists of three application objects AO-b1, AO-b2, and AO-b3, and that, in many cases, the scheduling of message passing between the application objects AO-b1 and AO-b2 has higher priority than that of message passing between the application objects AO-b1 and AO-b3 (This is performed not by the message-passing mechanism but by a scheduling mechanism). In addition, it is assumed that message passing having high priority is sometimes performed between the application objects AO-b1 and AO-b3. Accordingly, the application object AppB requires a message-passing mechanism for processing a message in accordance with its priority. If the application object AppB uses the simple message-passing mechanism used by the application object A, the processing of a message having high priority is delayed, causing a deterioration in the execution performance.

A system object having a simple message-passing mechanism is represented by MO, and a system object having a message-passing mechanism for processing a message in accordance with its priority is represented by MO2. It is assumed that the application objects AppA and AppB do not operate simultaneously. It is also assumed that the application objects AppA and AppB are downloaded and executed by another type of application object AppC, as required.

Figure 11:
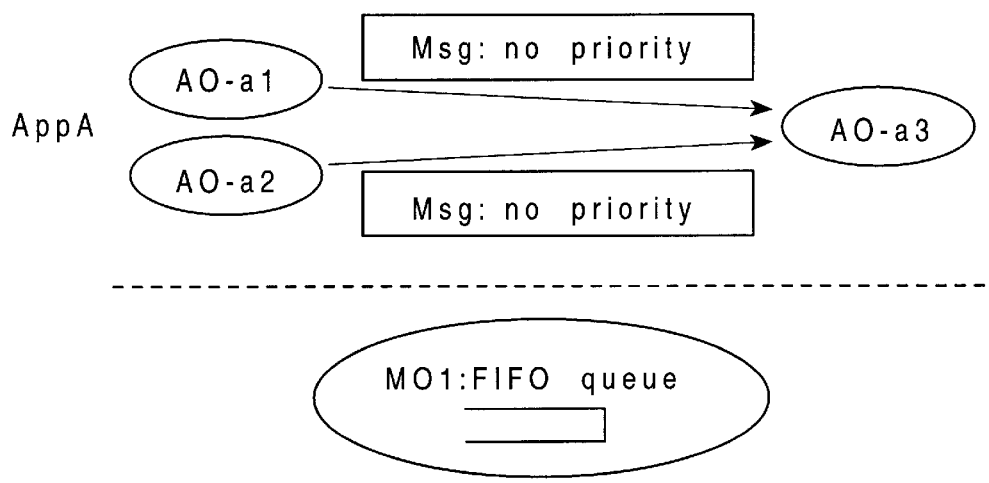
FIG. 11 is an illustration showing an example of a message-passing method improved by downloading a system object, the illustration specifically showing a state in which a system object having a simple message-passing mechanism has been downloaded.

When downloading the application object AppA, the application object AppC downloads System object MO1 before downloading the application objects AO-a1, AO-a2, and AO-a3. The state of a system in which the objects AO-a1, AO-a2, AO-a3, and MO1 have been downloaded as described above is shown in FIG. 11. At this time, when the application object AppB exists, the application objects AO-b1, AO-b2, and AO-b3 are unloaded, and System object MO2 is subsequently unloaded.

Figure 12:
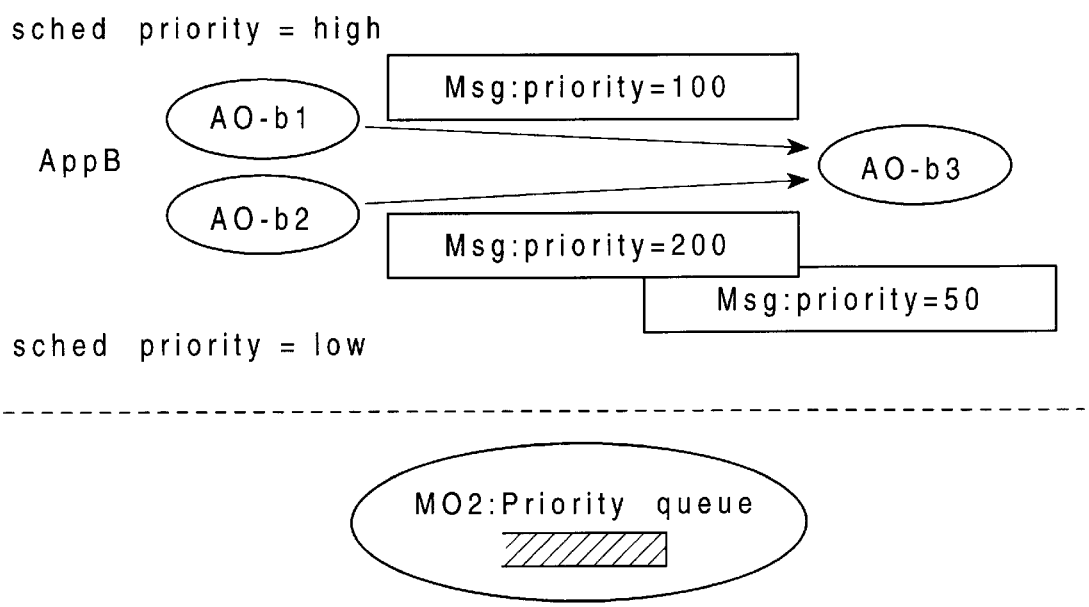
FIG. 12 is an illustration showing an example of a message-passing method improved by downloading a system object, the illustration specifically showing a state in which a system object having a message-passing mechanism processing a message in accordance with its priority has been downloaded.

When downloading the application object AppB, the application object AppC downloads System object MO2 before downloading the application objects AO-b1, AO-b2, and AO-b3. The state of a system in which the objects AO-b1, AO-b2, AO-b3, and MO2 have been downloaded, as described above, is shown in FIG. 12. At this time, when the application object AppA exists, the application objects AO-a1, AO-a2, and AO-a3 are unloaded, and System object MO1 is subsequently unloaded.

The above-described use of the downloading function makes it possible to use an optimal message-passing mechanism for each of the two application objects AppA and AppB having different types of nature.

The following is an example of a program for the method LoadAppA( ) used when application-object AppA is downloaded.

```
AppC::LoadAppA{
    Unload("AO-b1");
    Unload("AO-b2");
    Unload("AO-b3");
    Unload("MO2");
    Load("MO1");
    Load("AO-a1");
    Load("AO-a2");
    Load("AO-a3");
}
```

Here, among download-permitting level $Da\_appc$ on the application object AppC, download-accepting level $Dp\_mo1$ on System object MO1, and download-accepting level $Dp\_mo2$ on System object MO2, a relationship of $Da\_appc>Dp\_mo1$ and $Da\_appc>Dp\_mo2$ is set so as to satisfy the above-described Condition 1.

In the above-described example, a service list of System object MO1, a service list of System object MO2, system-dependent lists of the application objects AO-a1 AO-a2, and AO-a3, and system-dependent lists of the application objects AO-b1, AO-b2, and AO-b3 are described as follow:

$Sl\_mo1 = \{<ID\_AO\text{-}a1, Dl\_AO\text{-}a2>, <ID\_AO\text{-}a2, Dl\_AO\text{-}a1>, <ID\_AO\text{-}a3, Dl\_AO\text{-}a3>\}$
$Dl\_AO\text{-}al = \{<0x10, \{MO1\}> \ldots\}$
$Dl\_AO\text{-}a2 = \{<0x10, \{MO1\}> \ldots\}$
$Dl\_AO\text{-}a3 = \{<0x10, \{MO1\}> \ldots\}$
$Sl\_mo2 = \{<ID\_AO\text{-}b1, Dl\_AO\text{-}b1>, <ID\_AO\text{-}b2, Dl\_AO\text{-}b2>, <ID\_AO\text{-}b3, Dl\_AO\text{-}b3>\}$
$Dl\_AO\text{-}b1 = \{<0x10, \{MO2\}> \ldots\}$
$Dl\_AO\text{-}b2 = \{<0x10, \{MO2\}> \ldots\}$
$Dl\_AO\text{-}b3 = \{<0x10, \{MO2\}> \ldots\}$ (4.2. Example 2: Debug Mode)

An example in which the downloading mechanism is applied to a debug mode is described below with reference to FIG. 13.

In this example, it is assumed that application object AO to be downloaded and executed is debugged and that message passing is monitored for debugging.

In order to monitor message passing, it is required that a message-dump function be provided by changing the massage-passing mechanism so that a result of monitoring can be output to an output unit such as a printer or a display.

Figure 13:
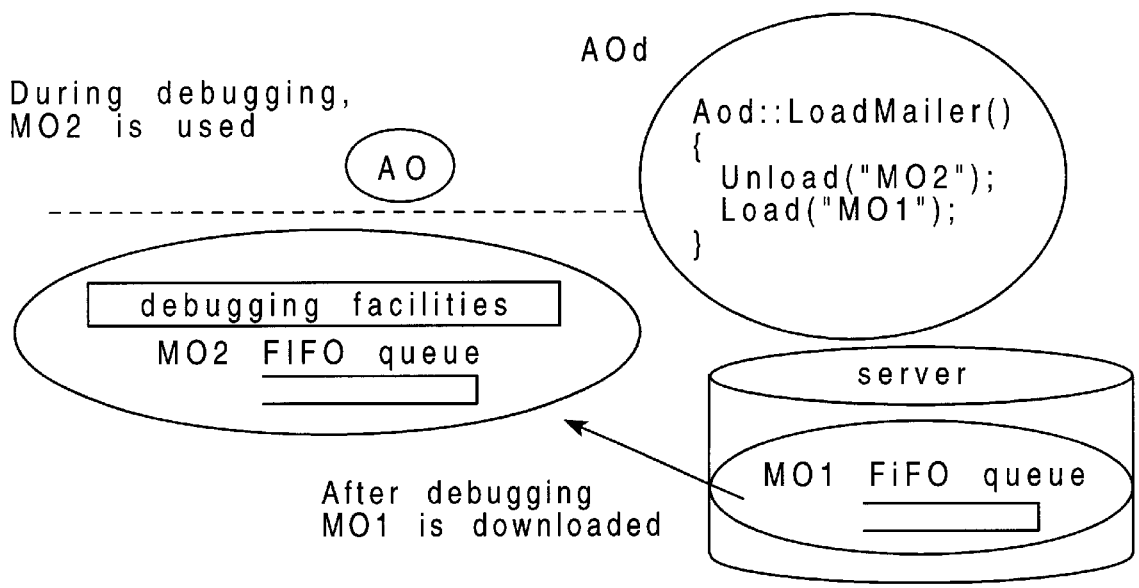
FIG. 13 is an illustration of an example in which a debug mode is realized by downloading a system object.

Accordingly, as shown in FIG. 13, System object MO2 having a message-passing mechanism having a debugging function is downloaded with timing for downloading application object AO, and System object MO1 having an ordinary message-passing mechanism is replaced by System object MO2. After application object AO is debugged, System object MO2 is replaced again by System object MO1.

With the above-described processing, message passing on all application objects is not monitored, but only message passing on an object to be debugged is monitored, whereby the debugging is facilitated.

(4.3. Example 3: Adaptive Network Protocol)

Two types of application programs App1 and App2 that use two different network protocols to communicate with a remote program are described below. Here it is assumed that an application program App1 uses the user datagram protocol/Internet protocol (UDP/IP) as a network protocol, while an application program App2 uses the digital storage media command and control (DSM-CC) as a network protocol. Implementation of a network protocol requires, in general a large storage size. Thus, it is difficult to implement many protocols in the embedded operating system beforehand. Accordingly, in such a case, the downloading mechanism to which the present invention is applied is very effective.

Figure 14:
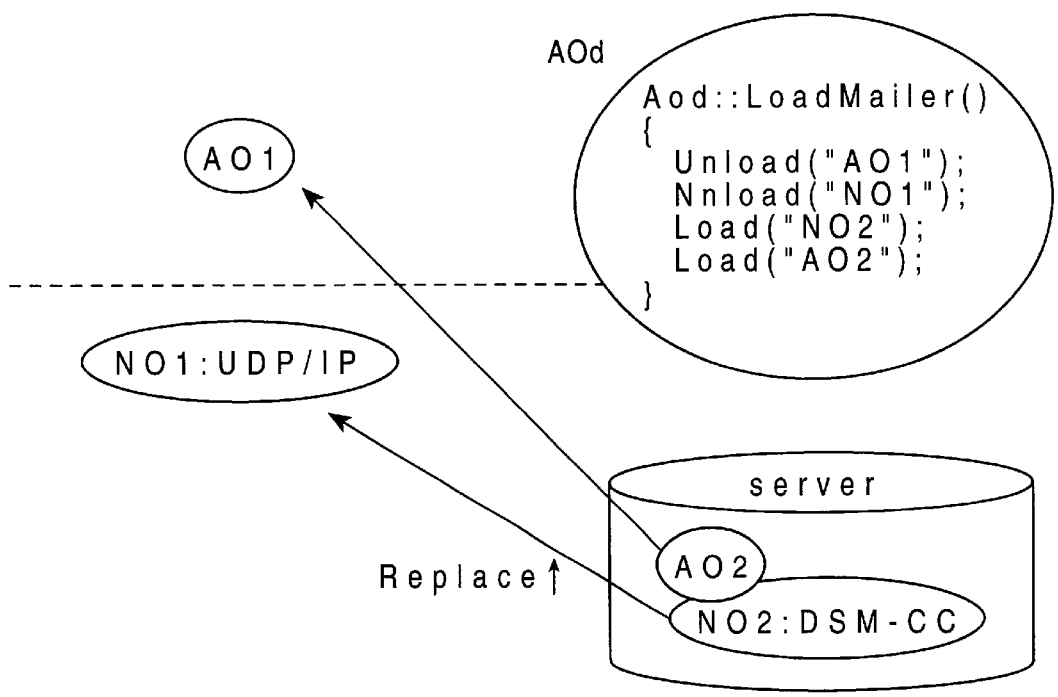
FIG. 14 is an illustration of an example in which adaptation to two different network protocols is established by downloading a system object.

A case where the downloading mechanism is applied is described below with reference to FIG. 14. It is assumed that application object App1 consists of application object AO1 and that application object App2 consists of application object AO2, as shown in FIG. 14. In FIG. 14, a UDP/IP-implemented system object NO1 and a DSM-CC-implemented system object NO2 are shown. When application object AO1 is downloaded, application object AO2 is unloaded before application object AO1 is downloaded. After that, application object AO1 is downloaded. When application object AO2 is downloaded, application object AO1 is unloaded before application object AO2 is unloaded. After that, application object AO2 is downloaded.

By downloading a system object providing a network protocol service, as described above, a network protocol required for an application object can always be prepared.

(4.4. Example 4: Adaptive Execution Environment)

There may be a case where the entire operating environment in which an application object is operating is changed. An example of the case is described below with reference to FIG. 15.

It is assumed that the application program AppA operates in an execution environment defined by a parallel object-oriented model and consists of application objects AO-a1 and AO-a2. It is also assumed that there are "Mailer1", "MemMgr1", and "ObjectCreator" as system objects for defining an execution environment for the application program AppA. "Mailer1" is a system object for providing a message-passing mechanism. "MemMgr1" is a system object for providing a memory management mechanism. "ObjectCreator" is a system object for providing an object-generating/deleting mechanism.

In addition, it is assumed that the application program AppB operates in a multi-thread-used operating environment and consists of application objects AO-b1 and AO-b2. It is also assumed that there are "Mailer2", "MemMgr2", and "ThreadCreator" as system objects for defining an execution environment for the application program AppB. "Mailer2" is a system object for providing an interthread communication mechanism. "MemMgr2" is a system object for providing a memory management mechanism. "ThreadCreator" is a system object for providing a thread-generating/deleting mechanism.

In this example, when the application program AppA operates, "Mailer2", "MemMgr2", and "ThreadCreator" are not required. When the application program AppB operates, "Mailer1", "MemMgr1", and "ObjectCreator" are not required.

Figure 15:
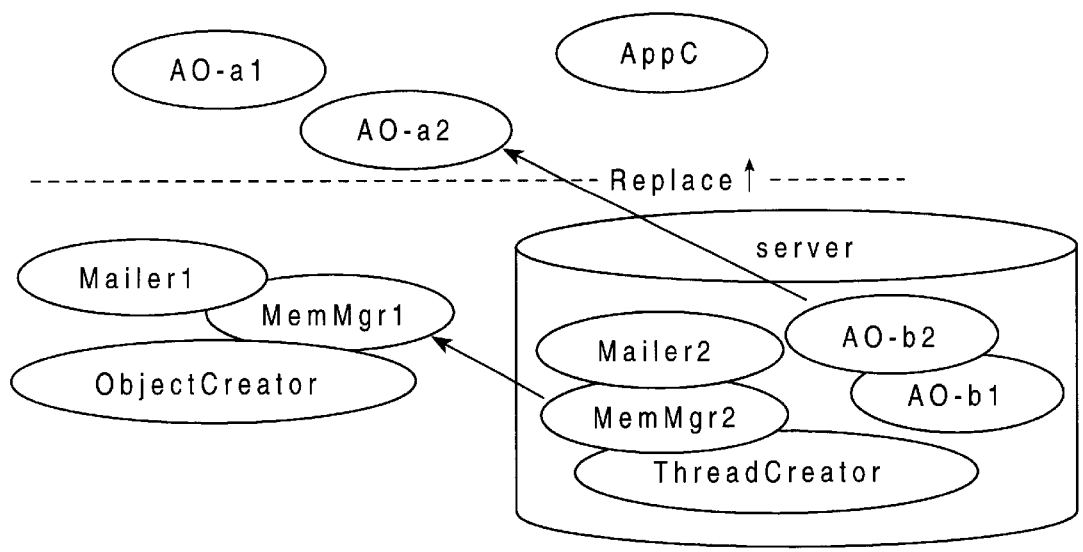
FIG. 15 is an illustration of an example in which the entire operating environment for an operating application object is changed by downloading a system object.

Accordingly, as shown in FIG. 15, when the application program AppA is downloaded and executed, the application program AppA, "Mailer1", "MemMgr1", and "ObjectCreator" are downloaded after the application program AppB, "Mailer2", "MemMgr2", and "ThreadCreator" are unloaded, and the application program AppA is executed on a system including "Mailer1", "MemMgr1", and "ObjectCreator".

Similarly, when the application program AppB is downloaded and executed, the application program AppB, "Mailer2", "MemMgr2", and "ThreadCreator" are downloaded after the application program AppA, "Mailer1", "MemMgr1", and "ObjectCreator" are unloaded, and the application program AppB is executed on a system including "Mailer2", "MemMgr2", and "ThreadCreator".

Let an application object for managing the downloading objects to be AppC. By way of example, when the application program AppA is loaded, application object AppC executes the following method AppC::LoadAppA( ) that uses application program interfaces "Load( )" and "Unload( )".

```
AppC::LoadAppA( )
{    Unload("AO-b1");
     Unload("AO-b2");
     Unload("Mailer2");
     Unload("MemMgr2");
     Unload("ThreadCreator");
     Load("Mailer1");
     Load("MemMgr1");
     Load("ObjectCreator");
     Load("AO-a1");
     Load("AO-a2");
}
```

Similar examples include a case where, when an application operating in a Unix environment and an application operating in a Java environment are taken into consideration, the Unix environment and the Java environment are replaced by each other.

5. Example of Construction Method on Operating System

An example in which a downloading mechanism on an operating system is realized such that the mechanism is separated into a plurality of objects is described below.

Figure 16:
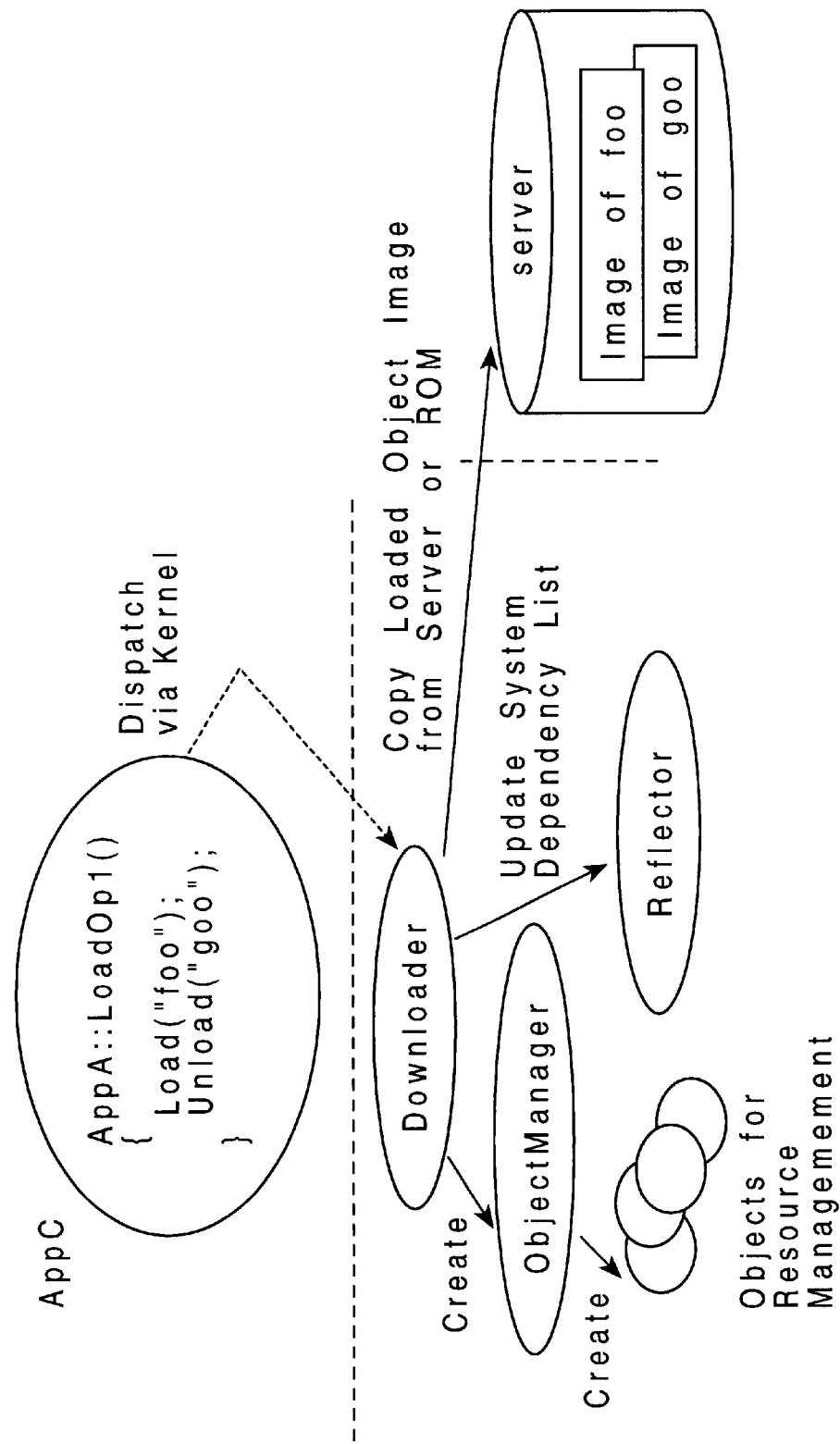
FIG. 16 is an illustration of realization of a downloading mechanism on an operating system by separating the mechanism into a plurality of objects.

In this example, the system objects "Downloader", "ObjectManager", and "Reflector" provide the downloading mechanism, as shown in FIG. 16. "Downloader" realizes the allocation phase in the load phase and the free phase in the unload phase (described in Section 3.3.3). "ObjectManager" realizes the generation phase in the load phase and the deletion phase in the unload phase (described in Section 3.3.3). "Reflector" initializes the application object in accordance with the execution environment, and updates the system-dependent list in the load phase in the procedure of downloading the system object.

For application program interfaces "Load( )" and "Unload( )", "Downloader" is a service provider. For example, when "Load( )" is used, "Downloader" is activated, and "Downloader" copies, in local memory on the system, an image (including the code and data areas) of an object to be downloaded and a binary image including object information such as an object name. "Downloader" requests "ObjectManager" to initialize a memory area to be used by the object. After that, an ID, execution threads, etc., are generated and initialized by "ObjectManager". The operation of the downloaded object is initiated.

As described above, according to the present invention, an object constituting an execution environment can be replaced in accordance with an execution subject. Therefore, without preparing a plurality of functions of predictable system services, an execution environment adapted for the execution subject can be provided.

What is claimed is:

1. A data processing system comprising:
   at least one execution subject including at least one object;
   at least one execution environment including at least one object for providing an execution subject with one or more services; and
   object-replacing means which, based on a request from a requesting object to replace a replacement object, deletes the replacement object and captures a new object from an external system, thereby performing processing for replacement of the replacement object;
   wherein the requesting object is an object of an execution subject or an object of an execution environment and the requesting object includes a download-permitting level representing the authority of the requesting object to replace objects, and
   wherein the replacement object is an object of an execution subject or an object of an execution environment and the replacement object includes a download-accepting level representing the resistance of the replacement object to being replaced, and the download-accepting level indicates a minimum download-permitting level required to replace the replacement object, and
   when said object-replacing means receives the request, said object-replacing means compares the download-permitting level of the requesting object with the download-accepting level of the replacement object, thereby determining, based on a result of the comparison, whether the replacement of the replacement object is permitted, and only when said object-replacing means has determined that the replacement of the replacement object is permitted, said object-replacing means performs processing for the replacement of the replacement object.

2. A data processing system according to claim 1, wherein said object-replacing means comprises an object constituting an execution environment.

3. A data processing system according to claim 1, wherein each of the download-accepting level and the download-permitting level is a numerical value corresponding to the priority of the object including the level, and wherein, when the download-permitting level included in the requesting object is greater than the download-accepting level included in the replacement object, said object-replacing means determines that the replacement of the replacement object is permitted.

4. A data processing system according to claim 1, wherein:
   the request also indicates a capture object to replace the replacement object,
   the capture object includes a download-accepting level representing the resistance of the capture object to being downloaded, and the download-accepting level of the capture object indicates a minimum download-permitting level required to capture the capture object,
   the download-permitting level of the requesting object also represents the authority of the requesting object to capture objects, and
   when said object-replacing means receives the request, said object-replacing means compares the download-permitting level of the requesting object with the download-accepting level of the capture object, thereby determining, based on a result of the comparison, whether the capture of the capture object is permitted, and only when said object-replacing means has determined that the capture of the capture object is permitted, said object-replacing means performs processing for the capture of the capture object.

5. A data processing system according to claim 4, wherein each of the download-accepting level and the download-permitting level is a numerical value corresponding to the priority of the object including the level, and wherein, when the download-permitting level included in the requesting object is greater than the download-accepting level included in the capture object, said object-replacing means determines that the capture of the capture object is permitted.

6. A data processing system according to claim 1, wherein:
   an object constituting an execution environment includes a service list on which objects to be provided with services are recorded; and
   when said object-replacing means performs processing for object replacement, said object-replacing means inspects the state of an object recorded on the service list included in an object to be deleted, thereby determining, based on a result of the inspection, whether the object replacement is permitted, and only when said object-replacing means has determined that the object replacement is permitted, said object-replacing means performs processing for the object replacement after copying the contents of the service list to a temporary storage area.

7. A data processing system according to claim 6, wherein, when all objects recorded on the service list included in the object to be deleted are not being executed and not awaiting a response to a message transmitted to another object, said object-replacing means determines that the object replacement is permitted.

8. A data processing system according to claim 6, wherein, when said object-replacing means performs the object replacement, said object-replacing means sets, based on the contents copied to the temporary storage area, the contents of the new object captured from the external system.

9. A data processing system according to claim 1, wherein:
   an object constituting an execution subject includes a system-dependent list on which objects for providing services to the object constituting the execution subject are recorded; and
   when said object-replacing means performs processing for object replacement, said object-replacing means updates the contents of a plurality of system-dependent lists on each of which the object to be deleted is recorded, and records the new object captured from the external system on the system-dependent lists.

10. A data processing system according to claim 1, wherein the external system is a server system connected to said data processing system by a transmission link, and includes a storage medium storing the object to be captured by said object-replacing means.

11. A data processing method for a data processing system comprising at least one execution subject including at least one object, and at least one execution environment including at least one object for providing an execution subject with one or more services,
   wherein said data processing method performs, based on a request from a requesting object to replace a replacement object, a deleting step for deleting the replacement object and a capturing step for capturing a new object from an external system, whereby the replacement object is replaced,
   wherein the requesting object is an object of an execution subject or an object of an execution environment and the requesting object includes a download-permitting level representing the authority of the requesting object to replace objects,
   wherein the replacement object is an object of an execution subject or an object of an execution environment and the replacement object includes a download-accepting level representing the resistance of the replacement object to being replaced, and the download-accepting level indicates a minimum download-permitting level required to replace the replacement object, and
   wherein said deleting step includes comparing the download-permitting level of the requesting object with the download-accepting level of the replacement object, thereby determining based on a result of the comparison, whether the replacement of the replacement object is permitted, and only when the replacement of the replacement object is permitted performing processing for the replacement of the replacement object.

12. A data processing method according to claim 11, wherein said deleting step includes;
   a freeing step for freeing a storage area occupied by the replacement object so that the replacement object is deleted.

13. A data processing method according to claim 11, wherein the replacement of the replacement object is permitted when the download-permitting level of the requesting object is greater than the download-accepting level of the replacement object.

14. A data processing method according to claim 11, wherein the deleting step inspects the operating states of all objects existing in a service list on which objects to be provided with services from the object to be deleted are recorded, and copies the service list in the object to be deleted to a temporary storage area when a result of the inspection is in predetermined condition.

15. A data processing method according to claim 14, wherein the predetermined condition is a case where all objects referred to in the service list in the object to be deleted are not being executed and not awaiting a response to a message transmitted to another object.

16. A data processing method according to claim 12, wherein said freeing step frees all data representing the replacement object from storage areas for the data processing system, whereby the replacement object is deleted in the data processing system.

17. A data processing method according to claim 11,
   wherein the request also indicates a capture object to replace the replacement object,
   wherein the capture object includes a download-accepting level representing the resistance of the capture object to being downloaded, and the download-accepting level of the capture object indicates a minimum download-permitting level required to capture the capture object,
   wherein the download-permitting level of the requesting object also represents the authority of the requesting object to capture objects,
   wherein said capturing step comprises:
      a right-inspecting step for inspecting, a right of processing on the capture object;
      a generating step for capturing the capture object from the external system and for generating a new object by reserving a storage area in the data processing system; and
      a recording step for recording the new object in an execution environment for the new object; and
   wherein said right-inspecting step includes comparing the download-permitting level of the requesting object with the download-accepting level of the capture object, thereby determining, based on a result of the comparison, whether the capture of the capture object is permitted, and only when the capture of the capture object is permitted performing the generating step and the recording step for capturing the capture object.

18. A data processing method according to claim 11, wherein:
an object constituting an execution environment is provided with a service list on which objects to be provided with services are recorded; and
before said deleting step, said data processing method inspects the states of objects recorded on a service list in the object to be deleted, and determines, based on a result of the inspection, whether the object replacement is permitted, and only when said data processing method has determined that the object replacement is permitted, said data processing method uses said deleting step and said capturing step to perform the object replacement after copying the contents of the service list to a temporary storage area.

19. A data processing method according to claim 18, wherein, in the determination, when all objects recorded on the service list in the object to be deleted are not being executed and not awaiting a response to a message transmitted to another object, said data processing method determines that the object replacement is permitted.

20. A data processing method according to claim 18, wherein said capturing step sets, based on the contents copied to the temporary storage area, the contents of the new object captured from the external system.

21. A data processing method according to claim 11, wherein:
an object constituting an execution subject is provided with a system-dependent list on which objects for providing services to the object constituting the execution subject are recorded; and
said capturing step updates the contents of system-dependent lists on which the object to be deleted in said deleting step is recorded, and records the new object captured from the external system in the system-dependent lists.

22. A data processing method according to claim 11, wherein the external system is a server system connected to said data processing system by a transmission link, and includes a storage medium storing the object to be captured by said object-replacing means.

23. A program-providing medium for providing a data processing program for use in a data processing system comprising at least one execution subject including at least one object, and at least one execution environment including at least one object for providing the execution subject with one or more services,
wherein said data processing program executes processing which, based on a request from a requesting object to replace a replacement object, deletes the replacement object and captures a new object from an external system, thereby performing processing for replacement of the replacement object,
wherein the requesting object is an object of an execution subject or an object of an execution environment and the requesting object includes a download-permitting level representing the authority of the requesting object to replace objects.
wherein the replacement object is an object of an execution subject or an object of an execution environment and the replacement object includes a download-accepting level representing the resistance of the replacement object to being replaced, and the download-accepting level indicates a minimum download-permitting level required to replace the replacement object, and
wherein said data processing program executes processing which includes comparing the download-permitting level of the requesting object with the download-accepting level replacement object, thereby determining, based on a result of the comparison, whether the replacement of the replacement object is permitted, and only when the replacement of the replacement object is permitted performing processing for the replacement of the replacement object.

24. A data processing system according to claim 1, wherein said execution subject is an application program and said execution environment is an operating system.

25. A data processing method according to claim 11, wherein said execution subject is an application and said execution environment is an operating system.

26. A program-providing medium according to claim 23, wherein said execution subject is an application program and said execution environment is an operating system.

* * * * *